United States Patent Office 2,762,807
Patented Sept. 11, 1956

2,762,807

2,3-ALKYLENEDIOXY-6-NITRO-9-(2 - HYDROXY-ALKYLAMINO) ACRIDINES AND THEIR PREPARATION

Edgar Alfred Steck, Guilderland, N. Y., assignor to Sterling Drug Inc., New York, N. Y., a corporation of Delaware No Drawing. Application October 27, 1953,
Serial No. 388,699

14 Claims. (Cl. 260—279)

This invention relates to 2,3-alkylenedioxy-6-nitro-9-(2-hydroxy-alkylamino)acridines and to their preparation.

These compounds of my invention have in free base form the structure

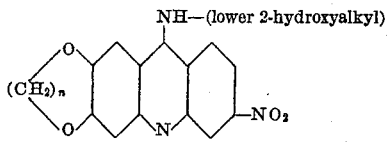

where $n$ is an integer from one to two. These compounds have been found to possess valuable chemotherapeutic properties, for instance, antirickettsial activity.

In the above general formula the lower 2-hydroxyalkyl radical has preferably two to six carbon atoms, encompassing such radicals having a hydroxy group attached to the carbon atom that is one carbon atom removed from the side chain nitrogen atom, such lower 2-hydroxyalkyl radicals including 2-hydroxyethyl, 2-hydroxypropyl, 2-hydroxy-2-methylpropyl, 2 - hydroxybutyl, 2 - hydroxy - 2 - methylpentyl, 2-hydroxyhexyl, and the like.

My 2,3-alkylenedioxy-6-nitro-9-(2-hydroxyalkylamino) acridines were prepared preferably by heating a mixture of phenol and the appropriate 2,3-alkylenedioxy-6-nitro-9-haloacridine to form the corresponding 2,3-alkylenedioxy-6-nitro-9-phenoxyacridine as the hydrohalide, which did not need to be isolated, and then heating the 2,3-alkylenedioxy-6-nitro-9-phenoxyacridine hydrohalide with the appropriate 2-hydroxyalkylamine. The 2,3-alkylenedioxy-6-nitro-9-chloroacridines were preferably used because of their ready availability and ease of preparation. Illustrative of this preparation is the reaction of 2,3-methylenedioxy-6-nitro-9-chloroacridine with phenol to form 2,3-methylenedioxy-6-nitro - 9 - phenoxyacridine monohydrochloride which on treatment, in either pure form or crude form (as directly obtained from the reaction mixture of the first step), with 2-hydroxethylamine yields 2,3-methylenedioxy - 6 - nitro - 9 - (2 - hydroxyethylamino)acridine.

Alternatively, the 2,3 - alkylenedioxy-6-nitro-9-(2-hydroxyalkylamino)acridines of my invention can be prepared by directly heating the appropriate 2,3-alkylenedioxy-6-nitro-9-haloacridine with a 2-hydroxyalkylamine, without first reacting the former compound with phenol.

The preparation of my 2,3-alkylenedioxy - 6 - nitro - 9-(2-hydroxyalkylamino)acridines was carried out under acidic conditions. When the reactant was a 2,3-alkylenedioxy-6-nitro-9-haloacridine, an acidic medium was afforded by the presence of the hydrohalic acid formed in the reaction. When the reactant was a 2,3-alkylenedioxy-6-nitro-9-phenoxyacridine, acidic conditions were produced either by using the 9-phenoxy compound in the form of its hydrohalic acid addition salt or by adding a small amount of a mineral acid.

The 2,3-alkylenedioxy - 6 - nitro - 9 - (2 - hydroxyalkylamino)acridines of my invention are therapeutically active whether employed in the form of their free bases or in the form of their salts with relatively non-toxic organic or inorganic acids. These salts can be prepared by treating the appropriate 2,3 - alkylenedioxy-6-nitro-9-(2-hydroxyalkylamino)acridine described above with the appropriate acid. In practicing the invention, it has been found convenient to isolate the compounds in the form of their hydrochlorides. However, other acid addition salts are within the scope of the invention. Such salts include the hydrobromides, hydroiodides, sulfates, nitrates, phosphates, citrates, sulfamates, tartrates, succinates, acetates, benzoates, oleates, and the like.

The following examples further illustrate specific embodiments of the invention.

*Example 1*

(a) *2,3 - methylenedioxy - 6 - nitro-9-chloroacridine.*—This compound was prepared by first heating 2-chloro-4-nitrobenzoic acid with 3,4-methylenedioxyaniline in the presence of copper powder to produce 2-(3,4-methylenedioxyphenylamino)-4-nitrobenzoic acid, which was then heated in toluene solution with phosphorous oxychloride to effect ring closure. These procedures are given in the following paragraphs:

A solution of 98.5 g. of anhydrous potassium carbonate in 145 ml. of water was heated to 60° C. with stirring. To this solution was added 144 g. of 2-chloro-4-nitrobenzoic acid, followed by 8 g. of copper powder, 8 g. of a filter aid such as Filtercel (an infusorial earth), and 98.5 g. of 3,4-methylenedioxyaniline dissolved in 500 ml. of ethanol. Ethanol was then removed by distillation until an internal temperature of 95° C. was reached, and the resulting solution was refluxed for five hours. The reaction mixture was steam distilled to remove any unreacted aniline derivative. The aqueous residue was filtered while hot and the collected solid was extracted three times with boiling water. The combined filtrate and extracts were chilled in an ice bath and acidified with an excess of concentrated hydrochloric acid. The red solid that separated was collected and purified by recrystallization from acetone-water. There was thus obtained 106.3 g. of 2-(3,4-methylenedioxyphenylamino)-4-nitrobenzoic acid, M. P. 240–241° C.

*Analysis.*—Calcd. for $C_{14}H_{10}N_2O_6$: C, 55.63; H, 3.34; N, 9.27. Found: C, 55.52; H, 3.36; N, 9.40.

Ring closure was effected as follows: 106.3 g. of 2-(3,4 - methylenedioxyphenylamino) - 4 - nitrobenzoic acid was dissolved in 1064 ml. of toluene. The solution was heated to reflux, heating stopped, and 155 g. of phosphorus oxychloride was added over a fifteen minute period. Heating was resumed at gentle reflux with stirring for three and one-half hours. The reaction mixture was cooled and the precipitate that separated was collected. The precipitate was added over a thirty minute period to a chilled (0° C.) solution containing 310 ml. of 10% aqueous sodium hydroxide solution and 410 ml. of water. The mixture was stirred for an additional two hours at 0° C. The solid was collected, triturated with ammonium hydroxide solution, washed with cold water and recrystallized from chlorobenzene. There was thus obtained 67.5 g. of 2,3-methylenedioxy-6-nitro-9-chloroacridine, M. P. 300–301° C.

*Analysis.*—Calcd. for $C_{14}H_7N_2ClO_4$: C, 55.55; H, 2.33; $N_{NO_2}$, 4.63; Cl, 4.71. Found: C, 55.51; H, 2.33; $N_{NO_2}$, 4.57; Cl, 11.82.

The above 2,3-methylenedioxy-6-nitro-9-chloroacridine and the corresponding 2,3-ethylenedioxy-6-nitro-9-chloroacridine of Example 2 (a) are disclosed and claimed in my copending U. S. application, Serial Number 388,698, filed Oct. 27, 1953.

(b) *2,3-methylenedioxy - 6 - nitro-9-(2-hydroxyethylamino)acridine.*—To a stirred solution of 9 g. of 2,3-methylenedioxy-6-nitro-9-chloroacridine dissolved in 30 g.

of phenol kept at about 95° C. was added dropwise 2.2 g. of 2 hydroxyethylamine, and the resulting reaction mixture was heated at about 95-97° C. for one hour. The mixture was cooled to about 60° C. and added to a chilled, stirred mixture of 60 ml. of concentrated hydrochloric acid and 300 ml. of acetone. The mixture was stirred for two hours at 0° C. after which time the resulting orange solid was collected and washed respectively with cold acetone, ether and an ether solution of hydrogen chloride. This solid (wt. 11.6 g.) was crystallized by dissolving it in 1200 ml. of water at 80° C., filtering the solution, and adding 150 ml. of concentrated hydrochloric acid at 65° C. The solution when chilled yielded about 10 g. of the product as orange microcrystals. A second recrystallization, followed by washing respectively with acetone and hydrogen chloride in ether solution, yielded the purified product (in about 59% yield), 2, 3-methylenedioxy-6-nitro-9 - (2 - hydroxyethylamino)acridine in the form of its monohydrochloride, M. P. above 300° C. with decomposition (cor.).

*Analysis.*—Calcd. for $C_{16}H_{13}N_3O_5 \cdot HCl$: N, 11.55; $N_{NO_2}$, 3.85; Cl, 9.75. Found: N, 11.04; $N_{NO_2}$, 3.81; Cl, 10.05.

Following the above procedure in the absence of phenol, i. e., heating 2,3-methylenedioxy-6-nitro-9-chloroacridine directly with 2-hydroxyethylamine, the same product, 2,3-methylenedioxy - 6 - nitro - 9 - (2-hydroxyethylamino) acridine in the form of its monohydrochloride salt, can be obtained.

Other compounds in the form of their monohydrochlorides, that can be prepared following the foregoing procedure using the appropriate 2-hydroxyalkylamine in place of 2-hydroxyethylamine include the following: 2,3-methylenedioxy - 6-nitro - 9 - (2-hydroxypropylamino) acridine, 2,3 - methylenedioxy - 6 - nitro-9-(2-hydroxybutylamino)acridine, 2,3-methylenedioxy-6-nitro-9-(2-hydroxy - 2 - methylpropylamino)acridine, 2,3-methylenedioxy-6-nitro-9-(2-hydroxyhexylamino)acridine, and the like.

*Example 2*

(a) *2,3 - ethylenedioxy - 6 - nitro-9-chloroacridine.*— This compound was prepared following the procedure described under Example 1 (a), as follows:

2-(3,4-ethylenedioxyphenylamino)-4-nitrobenzoic acid was prepared using 124 g. of anhydrous potassium carbonate in 182 ml. of water, 180 g. of 2-chloro-4-nitrobenzoic acid, 6 g. of copper powder, and 136 g. of 3,4-methylenedioxyaniline in 1300 ml. of methanol. The product was obtained as golden-brown needles, M. P. 249-250.5° C. (cor.) when recrystallized from ethanol-water.

*Analysis.*—Calcd. for $C_{15}H_{12}N_2O_6$: C, 56.96; H, 3.38; $N_{NO_2}$, 4.43. Found: C, 57.23; H, 3.53; $N_{NO_2}$, 4.32.

Ring closure was effected as in Example 1 (a) using 86 g. of 2-(3,4-ethylenedioxyphenylamino)-4-nitrobenzoic acid, 945 ml. of toluene and 113 g. of phosphorus oxychloride. The product, 2,3-ethylenedioxy-6-nitro-9-chloroacridine, melted at 282-284° C. (with decomposition) when recrystallized from chlorobenzene.

*Analysis.*—Calcd. for $C_{15}H_9N_2O_4Cl$: C, 56.88; H, 2.87; Cl, 11.19. Found: C, 57.42; H, 2.87; Cl, 11.50.

(b) *2,3 - ethylenedioxy - 6 - nitro-9-(2-hydroxyethylamino)acridine.*—This basic acridine was prepared following the procedure described for Example 1b using 9.5 g. of 2,3-ethylenedioxy-6-nitro-9-chloroacridine, 30 g. of phenol and 2.2 g. of 2-hydroxyethylamine. There was thus obtained, as brick-red microcrystals, 2,3-ethylenedioxy-6-nitro-9 - (2 - hydroxyethylamino)acridine in the form of its monohydrochloride, M. P. above 300° C. with decomposition (cor.).

*Analysis.*—Calcd. for $C_{17}H_{15}N_3O_5 \cdot HCl$: N, 11.13; Cl, 9.39. Found: N, 10.91; Cl, 9.21.

The foregoing 2,3-alkylenedioxy-6-nitro-9-(hydroxyalkylamino)acridines of my invention have antirickettsial activity, e. g., against epidemic typhus, as determined by the chick embryo technique.

I claim:

1. A compound selected from the group consisting of a 2,3 - alkylenedioxy - 6 - nitro - 9 - (2 - hydroxyalkylamino)acridine having the structure

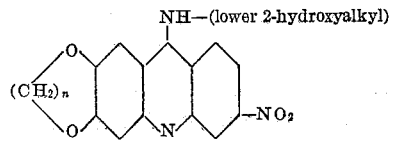

where *n* is an integer from one to two, and acid addition salts thereof.

2. A 2,3 - methylenedioxy - 6 - nitro - 9 - (2 - hydroxyalkylamino)acridine having the structure

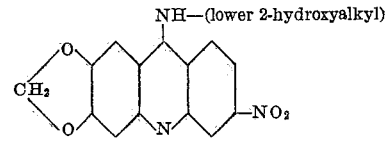

3. A 2,3 - ethylenedioxy - 6 -nitro - 9 - (2 - hydroxyalkylamino)acridine having the structure

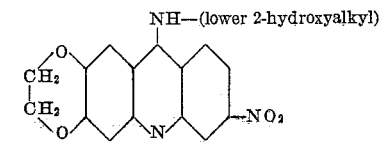

4. 2,3 - methylenedioxy - 6 - nitro - 9 - (2 - hydroxyethylamino)acridine.

5. 2,3 - ethylenedioxy - 6 - nitro - 9 - (2 - hydroxyethylamino)acridine.

6. The process of preparing a 2,3-alkylenedioxy-6-nitro-9-(2-hydroxyalkylamino)acridine having the structure

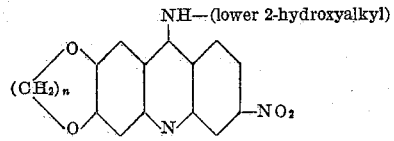

where *n* is an integer from one to two, which comprises heating a member of the group consisting of the corresponding 2,3 - alkylenedioxy - 6 - nitro - 9 - haloacridine and 2,3 - alkylenedioxy - 6 nitro - 9 - phenoxyacridine with a lower 2-hydroxyalkylamine under acidic conditions.

7. The process of preparing a 2,3-methylenedioxy-6-nitro-9-(2-hydroxyalkylamino)acridine having the structure

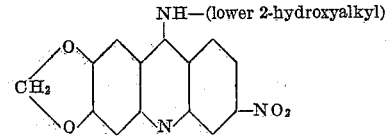

which comprises heating a 2,3-methylenedioxy-6-nitro-9-phenoxyacridine with a lower 2-hydroxyalkylamine under acidic conditions.

8. The process of preparing a 2,3-ethylenedioxy-6-nitro-9-(2-hydroxyalkylamino)acridine having the structure

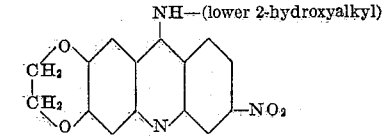

which comprises heating a 2,3-ethylenedioxy-6-nitro-9-phenoxyacridine with a lower 2-hydroxyalkylamine under acidic conditions.

9. The process of preparing 2,3-methylenedioxy-6- nitro-9-(2-hydroxyethylamino) acridine which comprises heating 2,3 - methylenedioxy - 6 - nitro - 9 - phenoxyacridine hydrochloride with 2-hydroxyethylamine.

10. The process of preparing 2,3-ethylenedioxy-6-nitro-9-(2-hydroxyethylamino)acridine which comprises heating 2,3-ethylenedioxy-o-nitro-9-phenoxyacridine hydrochloride with 2-hydroxyethylamine.

11. An acid addition salt of 2,3-methylenedioxy-6-nitro-9-(2-hydroxyethylamino)acridine.

12. An acid addition salt of 2,3-ethylenedioxy-6-nitro-9-(2-hydroxyethylamino)acridine.

13. 2,3 - methylenedioxy - 6 - nitro - 9 - (2 - hydroxyethylamino)acridine monohydrochloride.

14. 2,3 - ethylenedioxy - 6 - nitro - 9 - (2 - hydroxyethylamino)acridine monohydrochloride.

References Cited in the file of this patent

UNITED STATES PATENTS

| 1,962,277 | Jensch | June 12, 1934 |
| 2,531,010 | Surrey | Nov. 21, 1950 |
| 2,531,012 | Surrey | Nov. 21, 1950 |
| 2,647,900 | Surrey | Aug. 4, 1953 |